United States Patent [19]

Voles

[11] Patent Number: 4,862,176
[45] Date of Patent: Aug. 29, 1989

[54] IDENTIFICATION OF FRIEND OR FOE (IFF) SYSTEMS

[75] Inventor: Roger Voles, London, England
[73] Assignee: EMI Limited, Hayes, England
[21] Appl. No.: 879,804
[22] Filed: Feb. 17, 1978

[30] Foreign Application Priority Data

Feb. 20, 1977 [GB] United Kingdom ............... 2307

[51] Int. Cl.⁴ .......................................... G01S 13/78
[52] U.S. Cl. ........................................ 342/45; 342/50
[58] Field of Search .................... 343/6.5 R, 6.5 LC; 342/42, 45, 50

[56] References Cited

U.S. PATENT DOCUMENTS

| | | | |
|---|---|---|---|
| 3,750,163 | 7/1973 | Hecker | 343/6.5 R |
| 3,860,922 | 1/1975 | Wagner | 343/6.5 R X |
| 3,949,397 | 4/1976 | Wagner et al. | 343/6.5 R |
| 4,194,201 | 3/1980 | Stein | 342/45 |
| 4,322,729 | 3/1982 | Honold et al. | 342/45 |

*Primary Examiner*—T. R. Tubbesing
*Attorney, Agent, or Firm*—Fleit, Jacobson, Cohn, Price, Holman & Stern

[57] ABSTRACT

The IFF system uses basic identification codes which are transmitted between an interrogator and a responder. The basic codes are chosen in dependence upon the time and position of the interrogator or responder at the time of choice. In one version of the system, the lifetime of a code is less than or equal to the propagation time of a radio signal for a given maximum range between the interrogator or responder. Interactive interrogation may also take place using codes chosen in the same way as the basic codes. Local information may also be transmitted between the interrogator and transponder. An example of apparatus for performing these operations transmits basic or other codes together with a time code defining the time of production of the basic or other codes. It is not essential to transmit a time code in some circumstances. Position and time information may be gained from an external communications system.

10 Claims, 4 Drawing Sheets

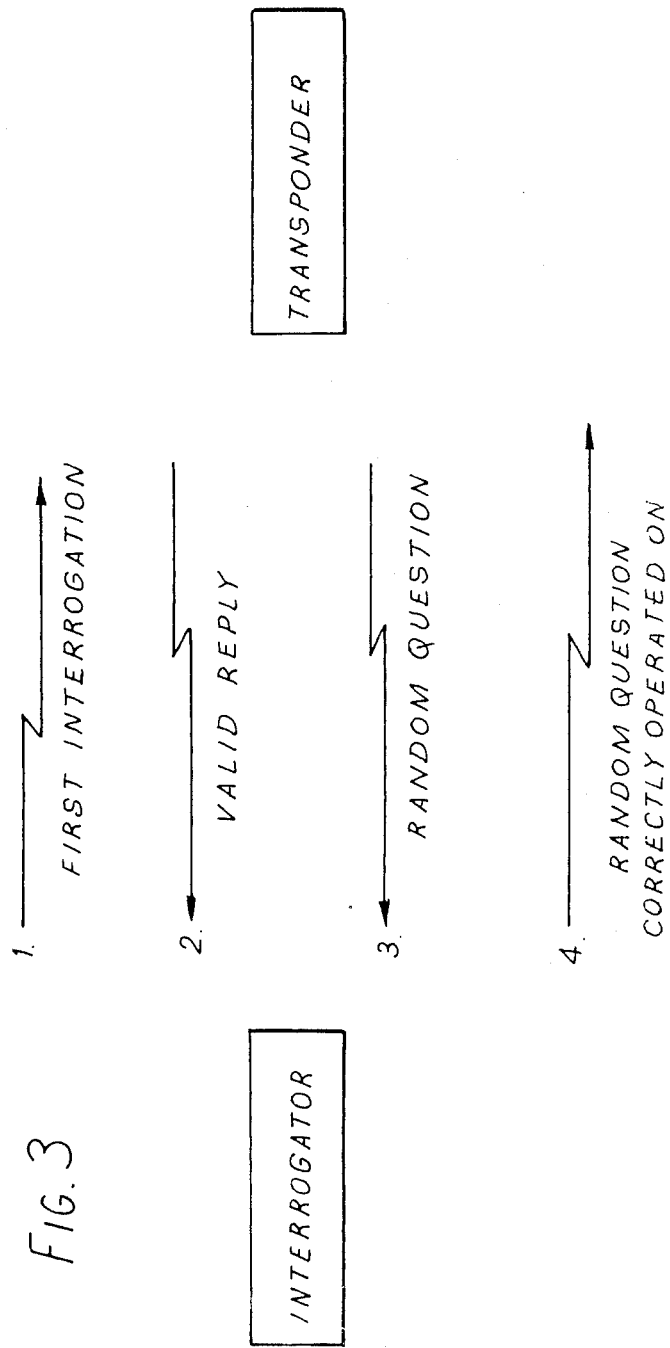

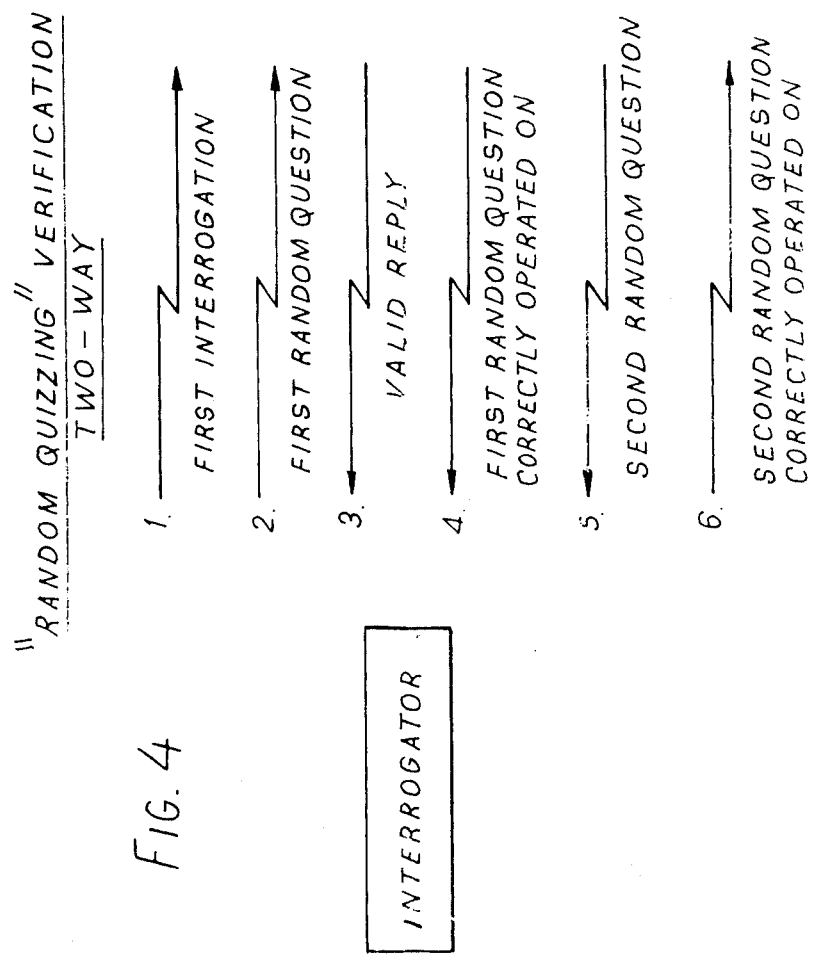

IDENTIFICATION OF FRIEND OR FOE (IFF) SYSTEMS

The present invention relates to IFF systems. In particular it relates to apparatus for use in systems.

In a known IFF system, all the IFF interrogators of a force use the same radio frequency and identify themselves by using the same digital interrogation code. Likewise all the transponders of the force use another common radio frequency, distinct from that used by the interrogators, and another common reply code. A weakness of this system is that by intercepting a valid interrogation and reply, an adversary can learn the appropriate codes. By promulgating these codes to his own forces, the enemy can then deceive the friendly transponders into replying and, more significantly, deceive the friendly interrogators into classifying hostile transponders as friendly ones.

By arranging for the interrogation and reply codes to be periodically changed simultaneously throughout the friendly force as frequent intervals, the said weakness is reduced, in that less time is allowed for the enemy to inform his forces of the codes currently used by the friendly forces.

However, a technically advanced enemy may have an efficient and fast communication system allowing codes to be distributed to his forces rapidly.

However, reducing the code lifetime to the point at which it is comparable to the time taken for a radio wave to propagate across an area of conflict limits the range of usefulness to an enemy of any intercept he makes of a friendly interrogation and reply. Thus, if the lifetime were reduced to 1 ms or 100$\mu$s, for instance, any intercept could only be used by an adversary within a range of 300 km or 30 km respectively.

Because the propagation delay from the interrogator to the transponder is comparable to or greater than the code lifetime, a necessary feature of such a system is that the local time be added to the interrogation and reply codes whenever it is suspected that the receiver cannot know the range of the transmitter to a sufficient accuracy. When an aircraft is interrogated by a surveillance radar it can be presumed that the aircraft's range is known to within say 1$\mu$s, at the radar base and so there is no need for local time to be added to the aircraft's reply code. On the other hand, although the direction of the interrogation could be measured from the aircraft, the range of the radar therefrom will not usually be known at the aircraft. Consequently, the interrogation code requires to be complemented by the time of the transmission. These local time codes can either be transmitted as distinct from the main code or encrypted with the main code in a suitable manner.

For all friendly users to be able to change their codes sychronously, they must all have a measure of time to an accuracy of a fraction of the code lifetime. This can be achieved by providing each user with a quartz, rubidium, or similar high-accuracy clock. Alternatively by using a satellite navigation system such as NAVSTAR, they could all obtain time by that means. When using-NAVSTAR, for instance, the more sophisticated user will know his position to an accuracy of better than 10 m for 90% of the time. Consequently, such a user will know local time (with respect to the NAVSTAR reference) to an accuracy of about 30 ms—far better than is required for this type of IFF.

With a 10$\mu$s code lifetime a vehicle setting off on a 4 hour sortie requires to store a sequence of $1.44 \times 10^9$ codes. If each code has a length of, say 10 bits, then the storage required is $1.44 \times 10^{10}$ bits which can be stored by means of conventional techniques.

According to an aspect of the invention, there is provided an IFF apparatus for transmitting a first code to and receiving a second code from another IFF apparatus, comprising a transmitter for transmitting the first code,
a receiver for receiving the second code,
means for producing the first code either in dependence upon the time of its production and upon the position of the apparatus or in dependence upon the time of production of the second code and upon the position of the another apparatus at the time of production of the second code,
an input for receiving positional information relating to at least the direction of the another IFF apparatus relative to the apparatus,
reference code producing means responsive to the positional information and to the time of production of the received code to produce at least one reference code, and
means for comparing the at least one reference code with the received code.

This aspect of the invention thus removes the necessity for the users to know the time with very high precision.

Each user of the system will usually know his position to about 5 km and possibly better, since navigation is of crucial importance, and a number of reversionary systems are usually provided to ensure this knowledge. Consequently, an area of conflict can be divided into, say, 10 km squares and a code from a sequence allocated to each. By this means, the security obtained is such that the codes can be changed at a relatively slow rate, i.e. slower than in the case, described above, where the code lifetime is comparable with the radio propagation time, although the codes could be changed at such a fast rate.

In those areas where the enemy can be expected to make relatively frequent intercepts, the rate of change of codes must be higher than in areas where the likelihood of an enemy interception is lower.

When a transmission is received by a user who is not able to measure the range of the source, it is a simple matter for the received signal to be decoded against the current codes relating to all the spatial squares in the direction of the source out to the maximum likely range; a positive correlation in one of them is then the required condition for acceptance.

A further feature of this technique is that any one user only has to have access to those code sequences which relate to the duration of his mission and to the geographical area over which he will be operating. This adds to the general security of the system.

The invention may include interactive interrogation, where, once the user interrogated has replied, further questions and answers will confirm the identity of the interrogator and replier, using additional covert codes organised as suggested hereinafter.

In interactive interrogation, the interrogated user, after giving the appropriate coded reply, also chooses a random number and transmits that too. The interrogator then uses a code word chosen from a separate code sequence (or uses a prescribed different part of the code sequence which has not yet been used for transmission)

to operate on the received random code in a prescribed manner. The "answer" is then transmitted by the interrogator and checked by the interrogated user to establish the verisimilitude of the interrogator.

The same technique can be applied the other way round; the interrogator adds its random "question" to its original interrogation and the interrogated user adds its answer to the standard code plus its question. Indeed, in this type of arrangement, there is very little to be gained by having a transponder transmit the standard reply code, as its answer to an interrogator question is really all that is required.

Additional confirmation of identity may be obtained by arranging for the interrogator to augument the original interrogation by a further statement coded in the covert code previously proposed. This further message would contain data hereinafter, and in the claims, referred to as "local information" of a very local nature which can be readily confirmed by the interrogated user but which is of such a special nature that the probability of it being accepted as valid by another interrogated user, even in the same vicinity in time and space, would be extremely low.

An example of the type of local information that could be covertly coded is the velocity of an interrogated vehicle along the sightline to the interrogator. The interrogator will often be included in a radar system tracking the vehicle which allows the relative velocity of the vehicle to be established quite accurately. The velocity of the interrogated vehicle is known accurately at the vehicle and the bearing of the interrogator can be established fairly accurately by means of the intercept receiver at the vehicle. Consequently, the relative velocity of the interrogated vehicle can be calculated with respect to the bearing of the interrogator and this can be used to check the correctness of the decoded version transmitted with the original interrogation. If the two values fail to correspond within reasonable limits, the interrogated vehicle will not transpond. It is clear that in order to successfully deceive the original interrogated vehicle, an enemy equipment must not only be in the same time and space vicinity as the friendly interrogator but must also have the same relative velocity.

Other local information which could be used in the above manner includes the height of the vehicle, the parameters of any transmission that the vehicle might be making, the track of the vehicle, and the relative range.

Similarly, if it is known that the interrogated vehicle can observe characteristics about the interrogator, then these could also be used in the original interrogation message. Thus, for instance, if the interrogator was an aircraft and the interrogated vehicle was a radar-equipped tank, the aircraft's elevation angle and closing speed could be the required local data.

Further security can be achieved against successful interception by the enemy of the transmitted codes by arranging for the sequence of codes also to specify the time at which the code is changed. These epochs can be made random in time so that even if the enemy does make a successful interception of a valid interrogation/reply, he will not know the duration of the validity and thus runs the risk of giving himself away by using obsolete codes.

Other features which may be incorporated in the system to counter any electronic counter measures against the IFF system are the use of spread spectrum signals (essentially an extension of coherent coding), by frequency shifting, by pulse-position coding or by phase-coding. It is possible to take advantage of these techniques to increase the complexity of the coding systems.

With the use of phase-coded transmissions the transmitted pulses length is relatively long and the peak power correspondingly smaller. Consequently, an intercept receiver needs the correct code in order to compress the received signal and extract the (coded) data. The phase code itself is preferably selected from a coded sequence also. The phase coding sequence could either be derived from the main sequence or be a completely separate sequence. If the latter arrangement were adopted, the rate of changing the codes could be on the same basis as the main sequence or on an entirely different one.

For a better understanding of the present invention, and to show how the same may be carried into effect, reference will now be made by way of example, to the accompanying drawings, in which:

FIGS. 3 and 4 are diagrams explaining interactive interrogation procedures.

An IFF system comprises an interrogator and a transponder. The interrogator includes a transmitter and receiver which might be a radar transmitter and receiver or a separate transmitter and receiver associated with a radar apparatus. The transponder is carried on a vehicle, e.g. an aircraft, ship or tank, and comprises a transmitter and receiver. The transponder automatically transmits a reply to a received interrogation.

Figure 1:
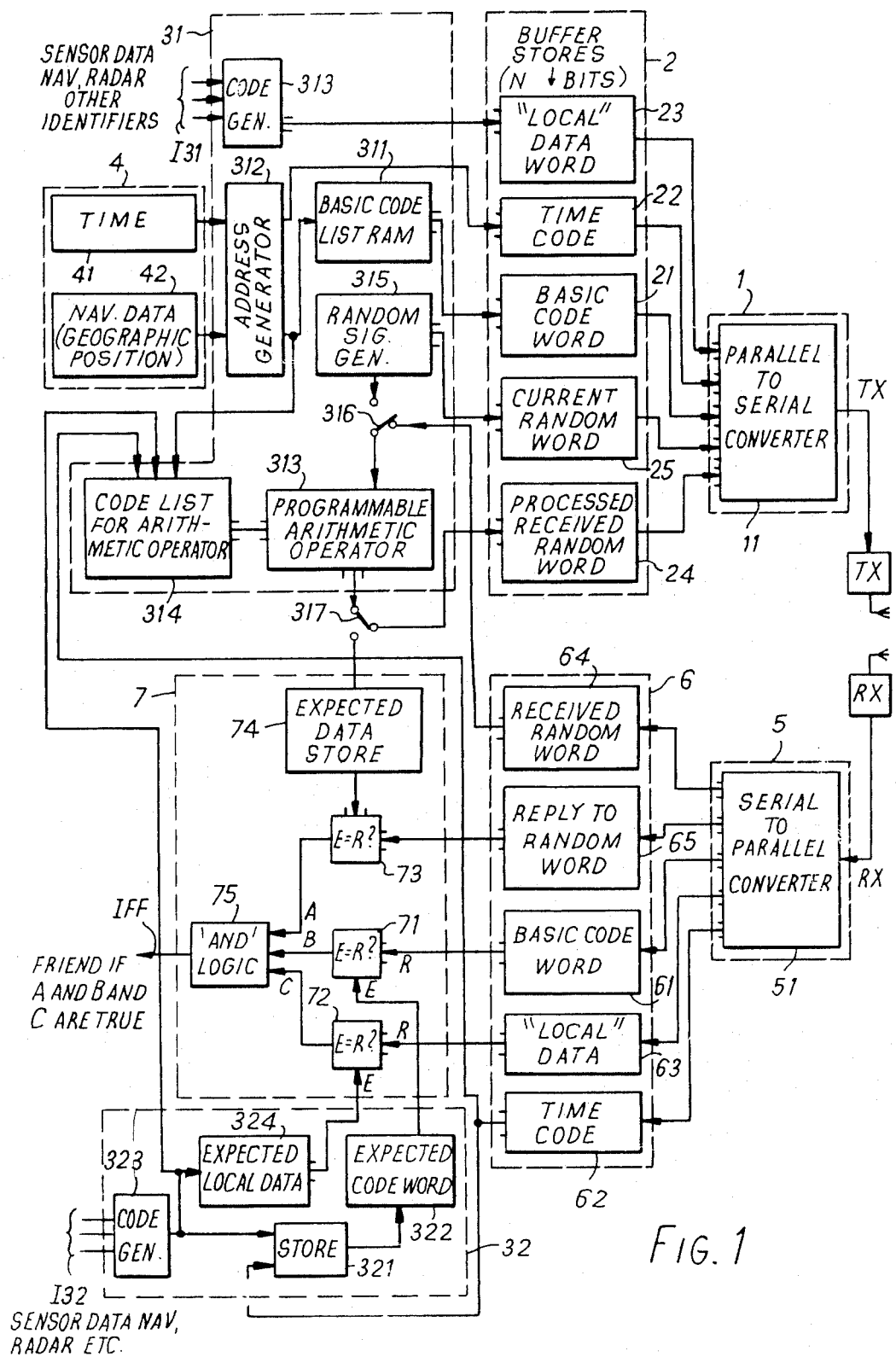
FIG. 1 is a block diagram of an IFF apparatus in accordance with the invention.

The exemplary IFF apparatus shown in FIG. 1 is applicable as a transponder or as an interrogator.

The shown apparatus comprises a transmitter TX, coupled via an encoder 1 to a buffer store arrangement 2, connected to receive, and store, codes produced by a first code producing means 31 which is controlled by a code production control means 4. The apparatus further comprises a receiver RX coupled via a decoder 5 to another buffer store arrangement 6 which receives, and stores, codes received by the receiver. These codes are applied to a comparing means 7 where the received codes are compared with reference codes produced by the first code producing means 31 and a second code producing means 32.

If the exemplary apparatus is an interrogator the general manner of its operation is as follows:

The transmitter TX transmits basic interrogation code chosen in dependence upon the time of choice to a target and (assuming the target replies) the receiver RX receives a basic reply code from the target which is compared with a basic reference reply code in comparing means 7 to produce an IFF signal at an output IFF indicating whether the target is a friend or foe.

If the exemplary apparatus is a transponder, the general manner of its operation is as follows:

When the receiver RX receives a basic interrogation code from an an interrogator, that basic code is compared in comparing means 7 with a basic reference code valid for the time of production of the interrogation code and if the comparison indicates the interrogator is a friend, an IFF signal is produced at the output IFF which causes the production of a basic reply code by the code producing means 31 which is transmitted by the transmitter TX. The reply code is chosen in dependence upon the time of its choice. Arrangements whereby the production of a reply code is caused in response to the IFF signal are well known in the art, and are not central to the invention, and are thus not shown in the drawings.

The apparatus shown in the drawings comprises conventional binary logic circuits, the codes being N bit binary words.

The apparatus, is adapted to operation in a selected one of two alternative preferred modes of operation.

In one of the modes, the basic interrogation and reply codes and the corresponding reference codes are changed at such a frequency that, for a predetermined maximum range of communication between an interrogator and a transponder, the period of validity of a said basic code is equal to, or less than, the time of propagation of a signal over that range. Typically IFF systems operate on line of sight and so the range might be 5 km and the code periods less than or equal to 16.7 μs. The range might be 60 to 70 km and the code period less than or equal to 200 μs to 233 μs. The range could be 300 km and the code period less than or equal to 1 ms.

In some applications (described hereinbefore) it is necessary for the codes to be transmitted together with the times for which they are valid and the following description refers to exemplary apparatus for use in such applications.

The apparatus when adapted to operate in the said one of the modes comprises a timing device 41 forming at least part of the code production control means 4. The timing device is adapted to operate at a frequency corresponding to the desired code period. It may be a highly accurate clock such as a quartz or rubidium clock. Use could be made of a satellite navigation system such as NAVSTAR to provide accurate timing. The timing device 41 causes an address generator 312 to produce access addresses for an addressable memory which in this example is a random access memory RAM 311. The RAM 311 stores a list of basic codes to be produced at respective specific times, the codes being stored at addresses corresponding to their desired time of production. The timing device and address generator cause the codes to be applied to a current basic code word buffer store 21, where the basic codes are temporarily stored before transmission.

A time code buffer store 22 is provided to store a code representing the time of validity of the code stored in the store 21. Conveniently, the address produced by address generator 312 represents the time, and this address is applied to the store 22.

The current code and the corresponding time code are applied to a parallel-to-serial converter 11 and their bits serially applied to the transmitter TX by the converter 11.

The receiver RX which, in the said one of the modes of operation, receives a signal which comprises a current code and its corresponding time code, applies these codes to a serial-to-parallel converter 51 which supplies the codes to corresponding basic code and time code buffer stores 61, 62. The received current code is applied to a comparator 71 where it is compared with a reference code word. The reference code is produced by the second code producing means 32. For this purpose the means 32 comprises a store 321 storing lists of reference or interrogation codes. The store 321 is addressed in a manner described hereinafter.

Assume for the present that the apparatus is an interrogator. At a specific time the timing device 41 causes the address generator 312 to address the RAM 311. A basic interrogation code and its corresponding time code are thus produced and supplied to the transmitter via the buffer stores 21 and 22 and the converter 11.

Now assume the apparatus is a transponder. The interrogation code and its associated time code and its associated time code are received by the receiver RX and applied via the converter 51 to the stores 61 and 62. The basic interrogation code is applied to the comparator 71. The time code is applied to the store 321 to cause the production of the reference reply code corresponding to the interrogation code at the time of production of the interrogation code. The reference reply code is applied to the comparator via the buffer store 322. If a predetermined comparison occurs between the received and reference codes the address generator 312 is caused to address the RAM 311 to choose a reply code dependent on the time of choice. This reply code and its corresponding time code are transmitted to the interrogator.

Now assume the apparatus is the interrogator again. The interrogator receives the reply code and compares it with a reference code in the same way as the transponder.

Figure 2:
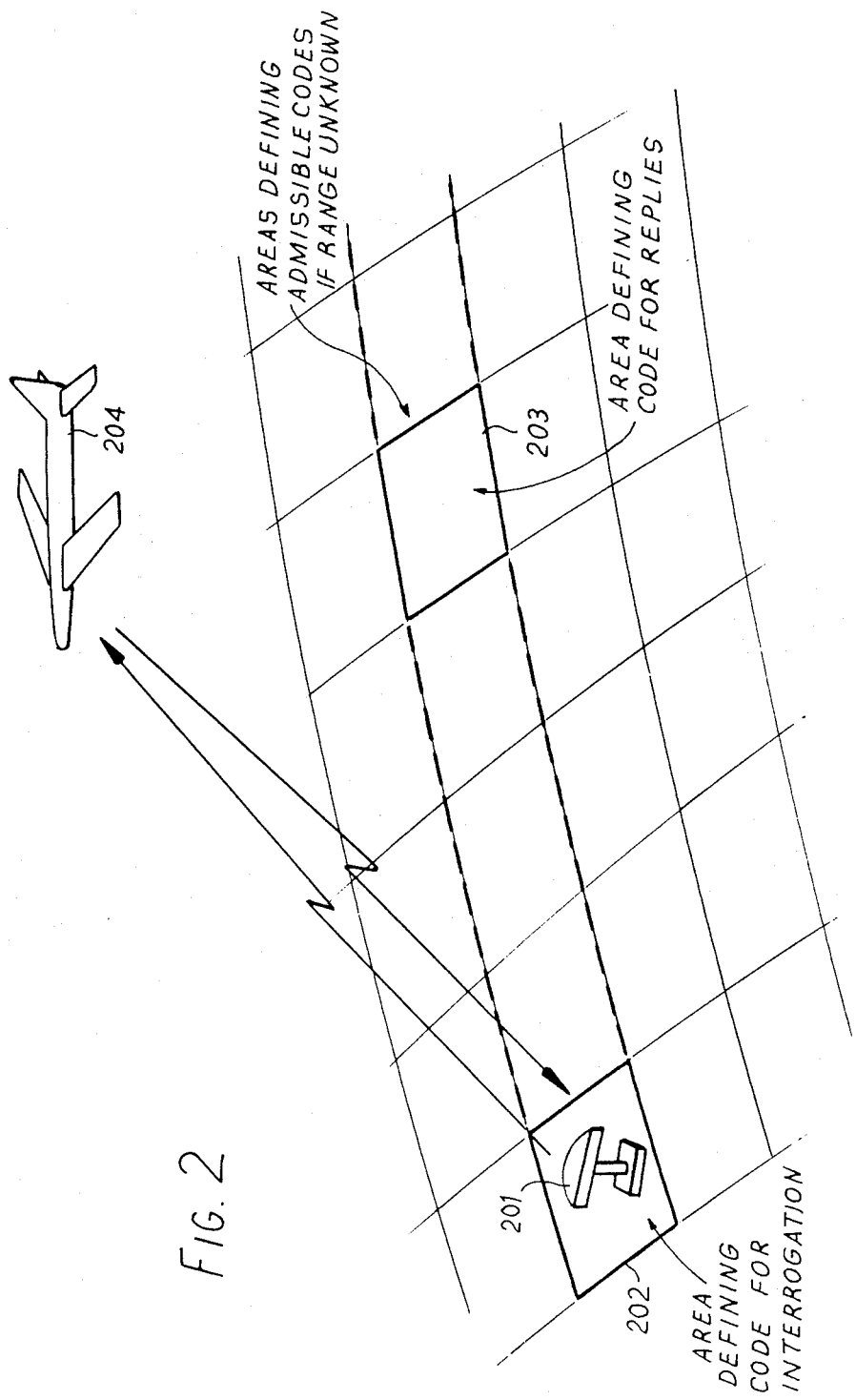
FIG. 2 is a diagram explaining a mode of operation of the apparatus.

In the other of the said two modes of operation, the interrogation and reply codes to be produced are chosen in dependence upon time and position at the time of choice. In some applications (described hereinbefore) it is necessary for the codes to be transmitted together with the times for which they are valid and the following description refers to exemplary apparatus for use in such applications. This other mode is applicable in the situation depicted in FIG. 2. Referring to that Figure, an interrogator 201 is positioned in a zone 202. The zone 202 is one of a rectangular array of zones notionally delineated in an area of interest; each zone for example, being a square having sides 10 km long. Sequences of codes are allocated to each zone, the code valid at any one time in a zone being dependent on the time. In FIG. 2, an aircraft carrying a transponder is above a zone 203. When interrogated with a code chosen from the sequence allocated to zone 202 at a specific time, the transponder compares that code with a reference code applicable to zone 202 at the said specific time, and provided the interrogator is identified as a friend, a reply code transmitted to it. The reply code is selected from the sequence allocated to zone 203 in dependence upon the time of reply.

When adapted to operate in this other mode of operation, the code production control means 4 comprises the said timing device 41 and, additionally a position-establishing device 42, and the address generator 312 is arranged to address the RAM 311 in dependence upon time and position information fed to it from the control means 4. The code produced by the RAM is fed to the store 21 and a corresponding time code 22 is fed to the store 22.

An interrogation or reply code and the corresponding time code received by the receiver RX are stored in buffer stores 61 and 62. The interrogation or reply code is then fed to the comparator 71 where it is compared with a reference interrogation or reply code to indicate whether the interrogator or transponder is friendly.

The interrogation or reply code received by the apparatus is produced according to the position of the corresponding interrogator or transponder and the time of production of the code and the apparatus needs to produce the appropriate reference code, i.e it needs to "know" the position of the interrogator or transponder at the time of production of the received code. (It "knows" the time of production from the time code).

For this purpose, the second code producing means has inputs I32 for receiving information as to the position of the interrogator or transponder which produced the received code. An interrogator is usually associated with a radar so, if the corresponding transponder is on e.g. an aircraft being tracked by the radar, such information is easily supplied to the interrogator by the radar. Similarly, in some circumstances, a transponder on an aircraft may be associated with equipment capable of producing information as to the position of the corresponding interrogator. Assuming this is the case, such information is applied, via the inputs I32, to a code generator 323 which produces from such information addresses for the store 321 which, in this mode of operation, stores the appropriate codes for all the zones of operation over which the aircraft of FIG. 2 flies on a particular mission. The appropriate reference code is applied to the comparator 71 via the buffer store 322.

Usually, when the transponder is in an aircraft, it can be supplied only with information as to the direction of the interrogator. In such a case, the code generator 323 produces the addresses in the store 321 of all reference codes, valid at the appropriate time (which is known from the time code), of all the zones up to a preset maximum range in the direction of the interrogator from the transponder. Each reference code is compared with the received code and provided one of them agrees with the received code, the interrogator is identified as friendly.

In either of the said two modes of operation, local information can be transmitted together with the basic code and the time code. Referring to FIG. 2 for example, the interrogator 201 is associated with a surveillance radar which can sense the height, range, speed, and/or bearing of the aircraft 204. At least some of such information is also known to the aircraft. Furthermore the interrogator and the aircraft may be capable of detecting the parameters of various transmissions taking place between them. Any information like this, which is known both to the interrogator and the transponder is referred to herein, and in the claims, as local information.

The apparatus comprises inputs I31 and I32 for receiving such local information. Code generators 313, and 323 encode that information. The generator 313 applies the encoded local information to a buffer store 23 for application via the converter 11 to the transmitter TX.

Any encoded local information received by the receiver RX is fed via the converter 51 to a buffer store 63. The received encoded local information is then compared in a comparator 72 with encoded reference local information produced by the second signal producing means 32. The means 32 receives the local information at the inputs I32, encodes it in the generator 323 and applies it via a buffer store 324 to the comparator 72.

In either of the said two modes of operation, interactive interrogation can take place either instead of, or in addition to, the transmission of local information.

Examples of interactive interrogation are shown diagrammatically in FIGS. 3 and 4. In FIG. 3, an interrogator first transmits an interrogation code and then a transponder transmits a reply code, followed by a random code (a question). The interrogator performs a preset operation on the random code and retransmits the code so operated on.

In FIG. 4, an interrogator transmits an interrogation code followed by a first random code (question) and the transponder transmits a reply code followed by the first random code on which it has performed a preset operation, followed by a second random code. The interrogator performs a preset operation on the second random code and retransmits that code so operated on.

The preset operations performed on the random code are defined by the interrogation or reply codes. Thus in the said one of the modes of operation of the apparatus the operations are chosen in dependence on time in the same way as the basic interrogation or reply codes, and in the said other mode, the operations are chosen in dependence upon time and position in the same way as the basic codes.

For the purpose, of interactive interrogation the code producing means 31 of the apparatus of FIG. 1 comprises a programmable arithmetic operator 313 which performs arithmetic operations on random codes. The operations performed at a particular time or time and place, are defined by a code fed to the operator 313 by a store 314 storing a list of codes defining arithmetic operations.

The store 314 is addressed by the address generator 312 in the same way as RAM 311. The arithmetic operation 313 is arranged to perform operations either on random codes produced by a random signal generator 315 of the code producing means or on random codes received by the receiver RX and which are fed to it via a random word store 64. The operator 313 is also arranged to feed operated-on codes to a buffer store 24 or to a comparator 73. Switching means 316, and 317 (indicated diagrammatically only) are provided for selecting the source of random codes to be operated on, and for selecting whether the operated-on codes are to be fed to the comparator 73 or store 24, respectively.

A buffer store 25 is arranged to receive random codes directly from the generator 315.

Referring to FIG. 3, first assume the apparatus of FIG. 1 is the transponder and has received a valid first interrogation. The transponder transmits a current reply code, a random code (produced by a signal generated by 315 and applied to transmitter TX via a store 23), and a time code. Now assume the apparatus of FIG. 1 is the interrogator. The receiver RX receives the codes which are fed via the converter 51 to the buffer store arrangement 6. Switch 316 is arranged to apply the received random code in the store 64 to the operator 313 which performs a preset operation on the code. The operation is defined by a code in store 314 which code is chosen by address generator 312 in dependence upon the time of choice of production of the code by the transponder as in the said one of the modes or upon time and position of choice of production of the random code by the transponder as in the said other of the modes.

For this purpose, in the said one mode the time code in store 62 is applied to the code generator 314, and in the said other mode a code indicative of the position of the transponder is fed to the generator 324. This position code is produced by the generator 323 using information fed to it via inputs I32 from e.g. a surveillance radar.

The operated-on code is then applied via switch 317 to the store 24 from which it is supplied to the transmitter TX via the converter 11. An associated time code (produced by address generator 312) is also transmitted).

Now, assuming the apparatus of FIG. 1 is again the transponder which originally transmitted the random code. The transponder receives the operated-on code which is fed via a store 65 to the comparator 73. At the time (or time and position) of production of the random code by generator 315 it was fed via switch 316 to the operator 313 where the operation appropriate to that time (or time and position) was performed on it. The code was then applied to a buffer store 74. When the random code operated on by the interrogator is received it is compared with the code in the buffer store 74.

It is believed that the operation of the apparatus in performing the interactive interrogation shown in FIG. 4 should be ascertainable from the foregoing and so will not be described herein.

A logic circuit 75 is provided where random codes and/or local information in addition to the basic codes are received. The circuit 75 comprises for instance an AND gate for producing an IFF signal only if all the received codes and/or local information agree with the reference codes and/or reference information.

The transmitter TX and receiver RX preferably operate on a spread-spectrum basis, e.g. The codes in turn encoded onto a carrier using a phase code, pulse code, pulse position code or a frequency shifting code. The phase codes used may be derived from the main codes (e.g. in RAM 311) or from another code sequence on the same basis as the main codes are derived, (i.e. in dependence upon time or time and position) or on a completely different basis.

Various modifications may be made to the apparatus as follows:

1. Instead of using a RAM as the addressable memory any other type of addressable memory could be used.
2. Instead of the code producing means producing time information separately from the codes as in FIG. 1, time information could be stored in the addressable memory 311 with the codes.
3. Instead of using an addressable memory such as RAM 311, or store 321, or store 314 to store codes, a pseudo random signal generator could be used instead of a store.
4. Instead of having separate stores such as 311, 314, 321, a single store could be used.
5. Instead of the transponder choosing relies to interrogations in dependence of the time (or time and position) at which the choice is made, the replies could be chosen in dependence upon the time (or time and position) associated with the interrogation.
6. In order to increase the security, the or each store storing codes preferably comprises a volatile store, i.e. a store in which all the stored information is automatically erased if power to the store is cut off.

What I claim is:

1. An IFF apparatus for transmitting a first code to and receiving a second code from another IFF apparatus, comprising
    a transmitter for transmitting the first code,
    a receiver for receiving the second code,
    means for producing the first code either in dependence upon the time of its production and upon the position of the apparatus or in dependence upon the time of production of the second code and upon the position of the another apparatus at the time of production of the second code,
    an input for receiving positional information relating to at least the direction of the another IFF apparatus relative to the apparatus,
    reference code producing means responsive to the positional information and to the time of production of the received code to produce at least one reference code, and
    means for comparing the at least one reference code with the received code.

2. Apparatus according to claim 1, wherein the first code producing means further comprises means for producing local information and wherein there is further provided means for combining the local information with the said code for combined application of the code and the local information to the transmitting means for transmission.

3. Apparatus according to claim 2 further comprising a local information comparator for comparing local information received by the receiver with reference to local information and a decoder coupled to receive from the receiving means a signal comprising the combination of a said code and local information, the decoder being operable to supply the said code and the local information to respective comparators.

4. Apparatus according to claim 1, wherein the transmitting means is a spread spectrum transmitter and the receiving means is a spread spectrum receiver.

5. Apparatus according to claim 1, wherein the first code producing means comprises means for generating codes dependent on the position of the apparatus, and a timing device for selecting a generated code in dependence upon the time of selection.

6. Apparatus according to claim 1, wherein the first code producing means comprises a memory device for storing a multiplicity of codes,
    a timing device for producing an indication of the time,
    a position establishing device for producing an indication of the position of the apparatus, and
    selecting means for selecting a stored code in dependence upon the said indications of time and position.

7. Apparatus according to claim 1, wherein the first code producing means comprises means for establishing time and position by receiving signals from an external communications system and means for generating the first code in dependence upon the established time and position.

8. An IFF apparatus for transmitting a first code to and receiving a second code from, another IFF apparatus comprising
    a transmitter for transmitting the first code,
    a receiver for receiving the second code,
    means for producing the first code in dependence upon the time of its production and upon the position of the apparatus, the first code including time information defining the time for which it is valid,
    an input for receiving positional information defining the position of the another IFF apparatus,
    reference code producing means responsive to the positional information and to the time of production of the received code to produce a reference code, and
    means for comparing the at least one reference code with the received code.

9. Apparatus according to claim 8, wherein the first code producing means comprises a memory device for storing a multiplicity of codes, a timing device for producing an indication of the time,
a position establishing device for producing an indication of the position of the apparatus,
selecting means for selecting a stored code in dependence upon the said indications of time and position, and
wherein there is further provided means for combining the said indication of time with the selected code.

10. An IFF apparatus for transmitting a first code to, and receiving a second code from, another IFF apparatus, comprising a transmitter for transmitting the first code,
a receiver for receiving the second code,
means for producing the first code either in dependence upon the time of its production and upon the position of the second code and upon the position of the another apparatus at the time of production of the said second code, any code associated with a particular position being available for transmission at a specific time for periods of less than 1 ms,
an input for receiving positional information relating to at least the direction of the another IFF apparatus relative to the apparatus,
reference code producing means responsive to the positional information and to the time of production of the received code to produce at least one reference code, and
means for comparing the at least one reference code with the received code.

* * * * *